(12) United States Patent
Doudoux et al.

(10) Patent No.: US 10,112,224 B2
(45) Date of Patent: Oct. 30, 2018

(54) CLADDING TUBE FOR NUCLEAR FUEL ROD, METHOD AND APPARATUS FOR MANUFACTURING A CLADDING

(71) Applicant: AREVA NP, Courbevoie (FR)

(72) Inventors: Jean-Luc Doudoux, La Plaine sur Mer (FR); Eric Galban, Nantes (FR); Yves Charbonnier, Corsept (FR); Jerome Boussin, Pontchateau (FR); Matthieu Ponce, Les Pieux (FR); Jan Patrice Simoneau, Lyons (FR); Joerg Peucker, Erlangen (DE); Holger Schmidt, Erlangen (DE); Klaus L. Nissen, Erlangen (DE)

(73) Assignee: AREVA NP, Courbevoie (FR)

( * ) Notice: Subject to any disclaimer, the term of this patent is extended or adjusted under 35 U.S.C. 154(b) by 651 days.

(21) Appl. No.: 14/678,767

(22) Filed: Apr. 3, 2015

(65) Prior Publication Data
US 2015/0239025 A1    Aug. 27, 2015

Related U.S. Application Data

(62) Division of application No. 13/121,917, filed as application No. PCT/EP2009/062634 on Sep. 29, 2009.

(30) Foreign Application Priority Data

Sep. 30, 2008   (EP) ..................................... 08305627

(51) Int. Cl.
*B21B 21/02*   (2006.01)
*G21C 21/02*   (2006.01)
(Continued)

(52) U.S. Cl.
CPC .............. *B21B 21/02* (2013.01); *B21B 15/00* (2013.01); *B21B 25/00* (2013.01); *B21H 8/00* (2013.01);
(Continued)

(58) Field of Classification Search
CPC ....... B21B 21/00; B21B 21/005; B21B 21/02; B21B 21/04; B21B 21/045;
(Continued)

(56) References Cited

U.S. PATENT DOCUMENTS 2,248,147 A    12/1939   Wilson
2,600,254 A *  6/1952   Lysobey ............... B26F 1/0038
                                              101/32
(Continued)

FOREIGN PATENT DOCUMENTS

DE    3405963    9/1984
FR    1252033    1/1961
(Continued)

OTHER PUBLICATIONS

Translation, JP 09-141328A, Jun. 1997.*

*Primary Examiner* — Edward Tolan
(74) *Attorney, Agent, or Firm* — Davidson, Davidson & Kappel, LLC

(57) ABSTRACT

A cladding tube for nuclear fuel made from metal and including concave dimples on its external surface. A nuclear fuel assembly includes at least a plurality of nuclear fuel rods provided with such cladding tubes. The cladding tube is advantageously manufactured by pilgrim rolling, the dimples being formed during the pilgrim rolling.

6 Claims, 6 Drawing Sheets

US 10,112,224 B2
Page 2

(51) Int. Cl.
*B21H 8/00* (2006.01)
*G21C 3/06* (2006.01)
*G21C 3/08* (2006.01)
*B21B 15/00* (2006.01)
*B21B 25/00* (2006.01)
*G21C 3/07* (2006.01)
*B21B 21/00* (2006.01)

(52) U.S. Cl.
CPC ............... *G21C 3/06* (2013.01); *G21C 3/07* (2013.01); *G21C 3/08* (2013.01); *G21C 21/02* (2013.01); *B21B 21/00* (2013.01); *Y02E 30/40* (2013.01)

(58) Field of Classification Search
CPC . B21B 2023/005; B21B 15/00; B21C 37/156; B21C 37/158; B21H 8/00
See application file for complete search history.

(56) References Cited

U.S. PATENT DOCUMENTS

| | | | |
|---|---|---|---|
| 2,703,999 A | 11/1953 | Gille | |
| 2,868,042 A * | 1/1959 | Bakos | B21H 7/10 72/185 |
| 3,154,141 A | 10/1964 | Huet | |
| 3,930,941 A | 1/1976 | Meerwald et al. | |
| 4,627,258 A * | 12/1986 | Loges | B21C 47/26 72/196 |
| 4,966,022 A * | 10/1990 | Stinnertz | B21B 25/04 72/208 |
| 6,154,151 A | 11/2000 | McElreath et al. | |
| 6,813,329 B1 | 11/2004 | Byers et al. | |
| 2002/0003849 A1 | 1/2002 | Drillon et al. | |
| 2005/0138981 A1* | 6/2005 | Wilhelm | B31F 1/07 72/197 |
| 2010/0034335 A1 | 2/2010 | Varanasi et al. | |

FOREIGN PATENT DOCUMENTS

| | | | |
|---|---|---|---|
| FR | 1285421 | 2/1962 | |
| FR | 1383261 | 12/1964 | |
| FR | 1388801 | 2/1965 | |
| JP | A57086085 | 5/1982 | |
| JP | A62217184 | 9/1987 | |
| JP | A6479690 | 3/1989 | |
| JP | 01-195391 A | 8/1989 | |
| JP | 04-99254 A | 3/1992 | |
| JP | 09-141328 A * | 6/1997 | ............ B21C 37/15 |
| JP | A2005003671 | 1/2005 | |
| JP | 2006064432 | 3/2006 | |
| JP | A2008164279 | 7/2008 | |

* cited by examiner

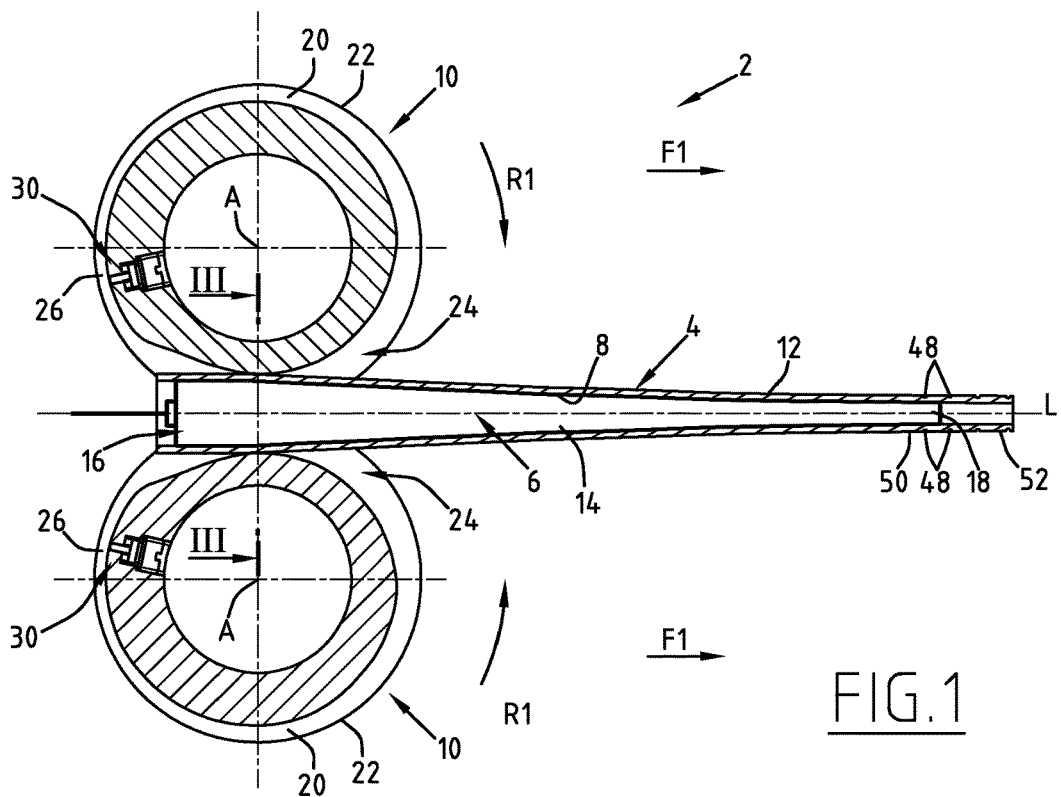
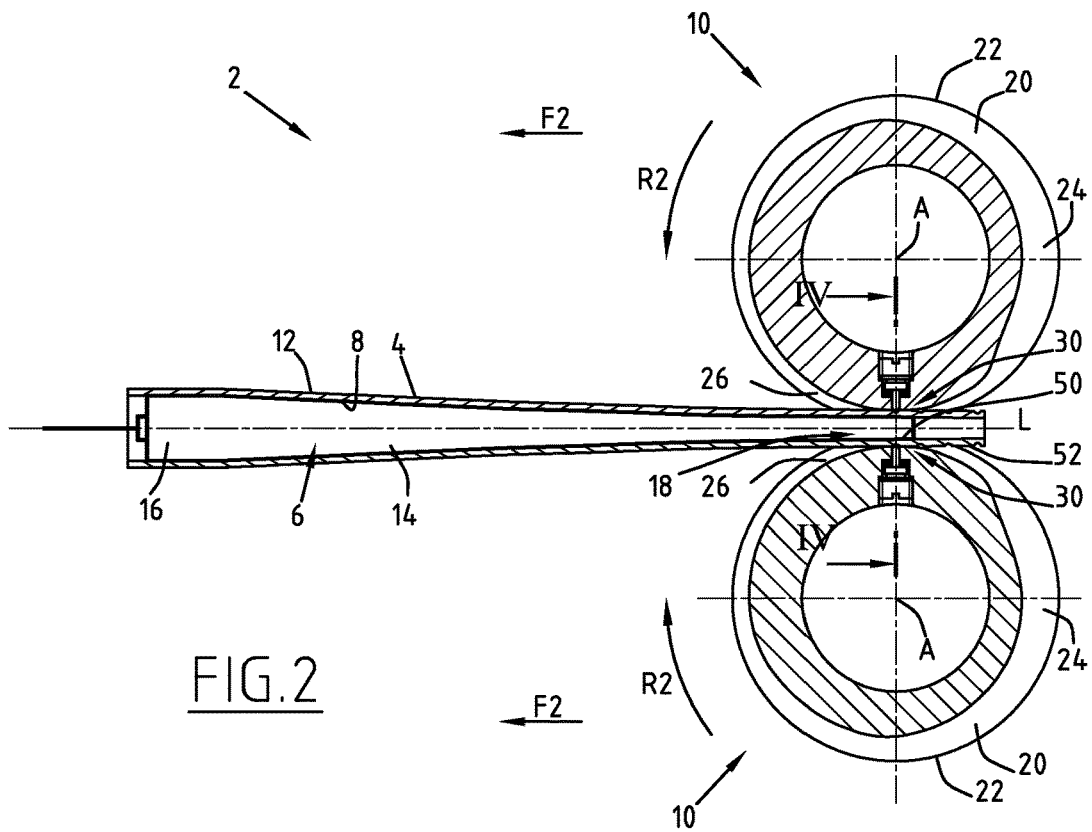

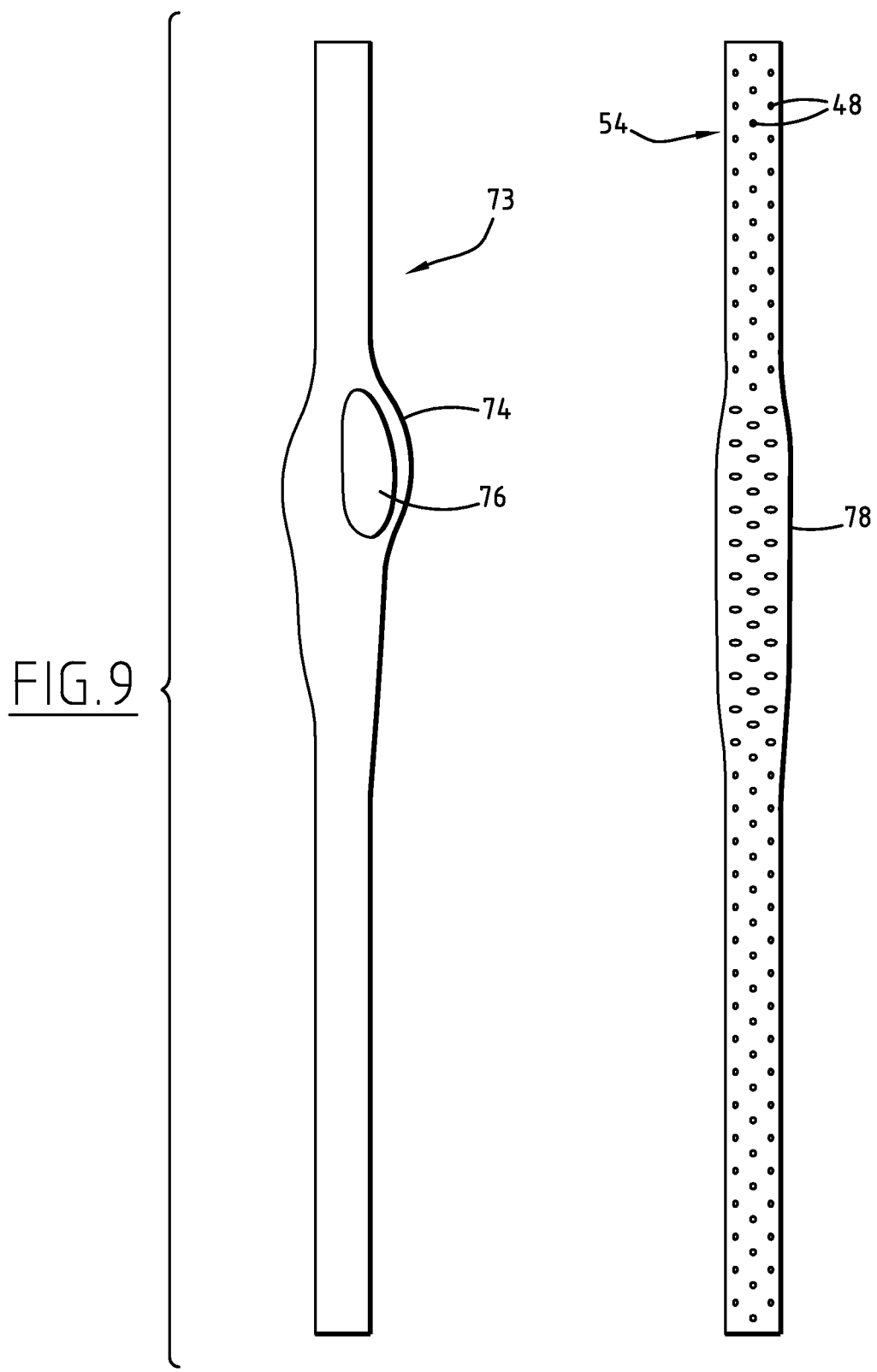

CLADDING TUBE FOR NUCLEAR FUEL ROD, METHOD AND APPARATUS FOR MANUFACTURING A CLADDING

This is a divisional application of U.S. patent application Ser. No. 13/121,917 filed Mar. 30, 2011, the entire disclosure of which is hereby incorporated by reference herein.

The present invention relates to a cladding tube for nuclear fuel rod, made from metal.

BACKGROUND

In certain types of nuclear reactors, such as light water reactors (LWR) including boiling water reactors (BWR) and pressurised water reactors (PWR) including those of Russian design VVER (Vodaa Vodiannee Energititscherski Reactor, in English Water Water Energy Reactor), the nuclear fuel is packed in nuclear fuel assemblies, each assembly comprising a bundle of nuclear fuel rods, each rod comprising a cylindrical cladding tube containing nuclear fuel and closing plugs welded to the ends of the cladding tube.

In operation, a heat transfer fluid (boiling water in BWR or pressurised water in PWR) circulates along the rods in order to extract the heat produced by the nuclear fuel. The heated fluid is then used in order to convert this heat into electrical energy.

SUMMARY OF THE INVENTION

It is desirable for the cladding tubes of nuclear fuel to exhibit a mechanical strength sufficient to resist to the internal stresses exerted by the nuclear fuel received in the tubes and the external stresses encountered in a nuclear reactor, whilst favouring heat exchanges between the nuclear fuel and the heat transfer fluid.

It is an object of the invention to provide a cladding tube for nuclear fuel which favours heat exchanges between the interior and the exterior of the tube whilst being strong.

To this end, the invention provides a cladding tube for nuclear fuel rod, made from metal, comprising dimples on its external surface.

According to other embodiments, the cladding tube comprises one or several of the following features, considered alone or in any technically possible combinations:
 the cladding tube has a smooth internal surface;
 the cladding tube has an external diameter between 6 and 20 mm;
 the cladding tube has a wall thickness between 0.4 and 1.5 mm;
 each dimple has a depth between 10% and 60% of the wall thickness of the cladding tube;
 each dimple has a contour in the shape of an ellipse or a circle;
 the contour of each dimple has a maximum dimension greater than 0.8 mm;
 the cladding tube is made from a zirconium-based alloy; and
 the dimples are obtained by punching.

The invention also provides a nuclear fuel assembly of the type comprising a bundle of nuclear fuel rods, each fuel rod comprising a cladding tube filled with a stack of nuclear fuel pellets, wherein the cladding tube of at least one fuel rod is a cladding tube as defined above.

The invention also provides a method of manufacture by pilgrim rolling of a metal cladding tube from a tubular blank, of the type in which the blank is progressively deformed by rolling between a mandrel inserted inside the blank and two dies disposed about the mandrel and reciprocally moved along the mandrel and by advancing the blank along the mandrel between reciprocating movements of the dies, wherein dimples are formed on the external surface of the blank during the rolling of the blank.

According to other embodiments, the method comprises one or several of the following features, considered alone or in any technically possible combinations:
 the dimples are formed with the aid of at least one punch disposed on one of the dies;
 the diameter of the blank is reduced during the pilgrim rolling;
 the dimples are formed at a front end of the mandrel with respect to the direction of advancing the blank along the mandrel during the pilgrim rolling;
 the blank is turned about an axis of the mandrel between reciprocating movements of the dies; and
 the metal tube has a smooth internal surface.

The invention also provides a pilgrim-rolling apparatus for the manufacture of a metal tube from a tubular blank, of the type comprising at least two dies and a mandrel received between the dies mounted so as to carry out reciprocating movements along the mandrel for rolling a blank fitted onto the mandrel between the mandrel and the dies, wherein at least one of the dies has at least one punch to form dimples on the external surface of a blank fitted on the mandrel during reciprocating movements of the dies.

According to other embodiments, the apparatus comprises one or several of the following features, considered alone or in any technically possible combinations:
 each die comprises a peripheral groove, the grooves of the dies forming a passage for the mandrel between the dies, each punch being disposed at the base of the groove of the corresponding die;
 the mandrel is of convergent shape along its axis, the or each punch being disposed in a calibration region of the groove of the corresponding die defining the passage for the mandrel when the dies are advanced and surround the end of the mandrel with a smaller diameter; and
 each die comprises at least one punch.

BRIEF DESCRIPTION OF THE DRAWINGS

The invention and the advantages thereof will be better understood by reading the description which follows, given solely by way of example and with reference to the appended drawings, in which:

FIGS. 1 and 2 show schematic side views of a pilgrim rolling apparatus according to the invention;

FIG. 9 shows a cladding tube according to the invention and a cladding tube of conventional design after a test simulating a loss of coolant accident.

DETAILED DESCRIPTION

Figure 3:
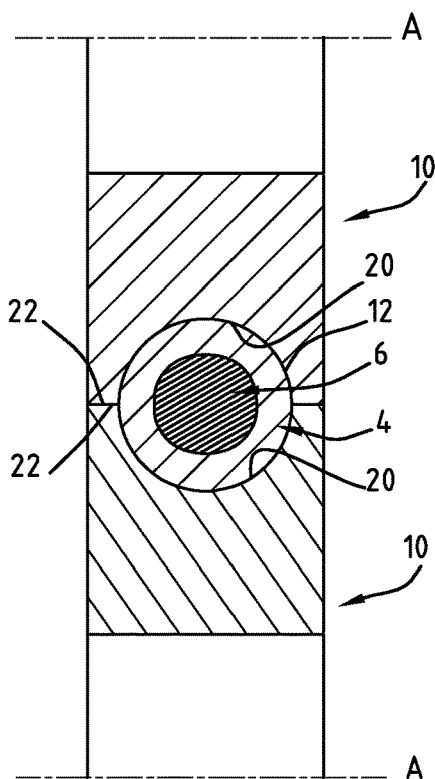
FIGS. 3 and 4 show sectional views according to III-III and IV-IV in FIGS. 1 and 2 respectively.

The pilgrim rolling apparatus 2 shown in FIGS. 1 and 2 makes it possible to manufacture a cladding tube for a nuclear fuel rod without welding, starting from a tubular metal blank 4 which is initially cylindrical and has a greater diameter and a smaller length than the tube which it is desired to obtain.

The apparatus 2 comprises, in a conventional manner, a mandrel 6 and two dies 10 disposed on either side of the mandrel 6 and intended to carry out reciprocating movements along the mandrel 6 in order to roll a blank 4 fitted on the mandrel 6.

The mandrel 6 is elongated along a longitudinal axis L. The mandrel 6 exhibits a rotational symmetry about its axis L. It has a convergent shape from a rear end of the mandrel 6 of greater diameter towards a front end of the mandrel 6 of smaller diameter.

More precisely, the mandrel 6 has a central portion 14 in the shape of a truncated cone which converges towards the front, an entry portion 16 which extends the central portion 14 towards the rear, and a calibration portion 18 which extends the central portion 14 towards the front (FIGS. 1 and 2).

The entry portion 16 has an external diameter substantially equal to the initial internal diameter of the blank 4. The entry portion 16 is substantially cylindrical.

The calibration portion 18 has a section substantially corresponding to the internal surface of the tube which it is desired to manufacture. In a known manner, the calibration portion 18 is very slightly conical and converges towards the front in order to facilitate the exit of the blank 4 at the front end of the mandrel 6.

Each die 10 has the shape of a cylinder of axis A having a circumferential groove 20 extending over its external peripheral surface 22. The groove 20 of each die 10 has a semi-circular cross-section with a diameter which decreases continuously from an entry region 24 of the groove 20 to a calibration region 26 of the groove 20.

The dies 10 are disposed on either side of the mandrel 6 in such a way that their grooves 20 face one another and define a passage for the mandrel 6 between the dies 10. The axes A of the dies 10 are perpendicular to the axis L and parallel with one another.

In a known manner, the dies 10 are mounted so as to be contrarotating about their axes A and movable in translation along the axis L in such a way as to be able to move along the mandrel 6 whilst turning about their axes A and carrying out reciprocating movements.

In a retracted position (FIG. 1) the entry portion 16 is received in the entry regions 24. The dies 10 define with the mandrel 6 an annular passage having substantially the dimensions of the blank 4 in the initial state (FIG. 3).

Figure 4:
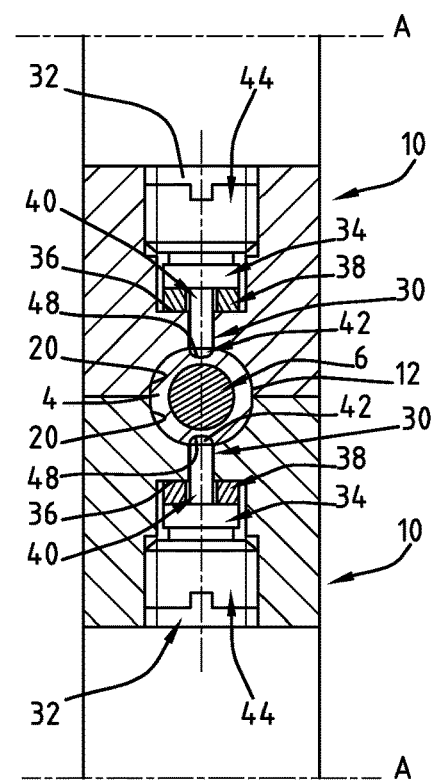

In an advanced position (FIG. 2) the calibration portion 18 is received in the calibration regions 26. The dies 10 define with the mandrel 6 an annular passage having substantially the dimensions of the tube which it is desired to obtain (FIG. 4).

The dies 10 move in a "forward" movement from the retracted position to the advanced position by turning in the direction of the arrow R1 and advancing according to the arrow F1 (FIG. 1).

Conversely the dies 10 move in a "return" movement from the advanced position to the retracted position by turning in the direction of the arrow R2 and moving back according to the arrow F2 (FIG. 2).

In a known manner, the apparatus 2 comprises means for moving the blank 4 fitted on the mandrel 6 along this latter and to make the mandrel 6 pivot about the axis L in order to move the blank 4 in rotation about the axis L.

As shown in FIG. 4, each die 10 comprises a punch 30 projecting from the base of its groove 20 in order to mark a dimple 48 into the external surface 12 of the blank 4 during a reciprocating movement of the die 10.

In the context of the invention, a dimple 48 generally designates a hollow indentation or a depression provided on a surface.

The punch 30 of each die 10 is disposed in the calibration region 26 of the groove 20 of this die 10, in order to make the dimple 48 when the die 10 is in the advanced position at the front end of the mandrel 6.

For the mounting of the punch 30 the die 10 has a bore 32 for receiving the punch 30 which extends through the die 10 radially with respect to the axis A thereof and opens into the base of the calibration region 26 of its groove 20.

The bore 32 is stepped and comprises coaxial cylindrical longitudinal sections with diameters decreasing from the interior towards the exterior of the die 10, separated by shoulders which are radial with respect to the axis of the bore 32.

The punch 30 has a disc-shaped foot 34 received in the bore 32 bearing against a shoulder 36 via an annular spacer 38, and a cylindrical rod 40 extending from the foot 34 through the bore 32 as far as the end of the bore 32 which opens into the groove 20.

The free end of the rod 40 projects into the groove 20 and forms the tip 42 of the punch 30. In the illustrated example the tip 42 has the shape of a spherical segment.

Each die 10 comprises a setscrew 44 screwed into a threaded longitudinal section of the bore 32 and bearing on the foot 34 of the side opposite the rod 40. The setscrew 44 is tightened in order to keep the punch 30 bearing on the shoulder 36 by way of the spacer 38.

The choice of the thickness of the spacer 38 makes it possible to adjust the height of the tip 42 projecting into the groove 20, and thus the dimensions of the dimple 48 which the tip 42 will make.

The invention is not limited to the rolling apparatus 2 of the illustrated example. Other embodiments of the rolling apparatus 2 can vary by the number of dies 10 and the mode of mounting, the number and/or the position of the punches 30. For example as a variant at least one of the dies 10 has no punch 30. As a variant or as an option at least one die 10 comprises a plurality of punches 30.

The punches 30 are not necessarily disposed in the calibration regions 26 of the grooves 20. As a variant or as an option one die 10 comprises one or a plurality of punches 30 in a region of the groove 20 upstream of the calibration region 26, in order to make a dimple 48 in the blank 4 with regard to the conical central portion 14 of the mandrel 6.

The tip 42 is chosen as a function of the shape which it is desired to give to the dimples 48 which will be left in the blank 4 by the punch 30.

It is possible to provide means for adjustment of the position of the punches 30 which are different from those of the illustrated example.

The apparatus 2 of FIGS. 1 to 4 makes it possible to implement a pilgrim rolling method in order to obtain from a cylindrical tubular metal blank 4 a cylindrical tube having a smooth cylindrical internal surface 8 and a cylindrical external surface 12 provided with concave dimples 48 without deterioration of the internal diameter d or of the internal surface 8.

In the pilgrim rolling method, the blank 4 is progressively deformed by rolling the blank 4 on the mandrel 6, with the aid of dies 10 which are displaced jointly with reciprocating movements along the mandrel 6 between the retracted position (FIG. 1) and the advanced position (FIG. 2), and moving the blank 4 forwards along the axis L between the reciprocating movements.

In this view, the mandrel 6 is inserted in the interior of the tubular blank 4 which initially has a constant cross-section over its entire length with a smooth internal surface 8 and a smooth external surface 12.

Then the dies 10 are moved by repeated reciprocating movements between the retracted position (FIG. 1) and the advanced position (FIG. 2), and the blank 4 is moved forwards along the mandrel 6 between the reciprocating movements.

When the blank 4 has been advanced with respect to the mandrel 6 its shape no longer corresponds to that of the mandrel 6. During the subsequent reciprocating movement of the dies 10, the blank 4 is deformed by being rolled between the dies 10 and the mandrel 6.

When the blank 4 is sufficiently advanced along the mandrel 6, at the end of the forward travel of the dies 10, each punch 30 makes a dimple 48 on the section 50 of the blank 4 situated at the front end of the mandrel 6.

The length portion 52 of the blank 4 which extends beyond the mandrel 6 has a cylindrical tubular shape and has dimples 48 on its external surface 12, the internal surface 8 remaining smooth. The length portion 52 corresponds to the tube which it is desired to obtain for use as a cladding tube 54 for a nuclear fuel rod.

Due to the repetition of the reciprocating movements of the dies 10 and the displacement of the blank 4 along the mandrel 6, the blank 4 advances by successive steps along the mandrel 6 and progressively assumes the desired shape. Thus the blank 4 is elongated and its diameter is reduced.

In order to form the dimples 48 distributed over the circumference of the external surface 12 of the blank 4, the reciprocating movements of the dies 10 and the axial displacements of the blank 4 along the mandrel 6 are combined with displacements of the blank 4 in rotation about the axis L. Thus between two successive reciprocating movements of the dies 10 the blank 4 is displaced along the mandrel 6 and/or the blank 4 is displaced in rotation about the axis L.

Figure 5:
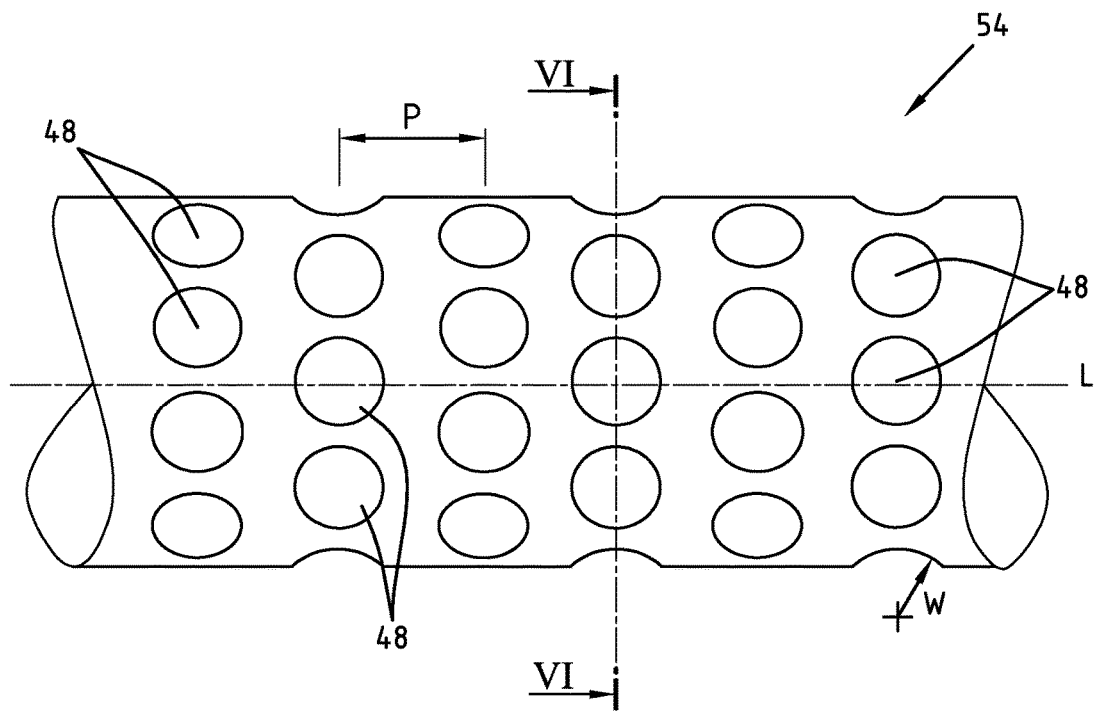
FIGS. 5 and 6 show schematic views, respectively from the side and in cross-section, of a cladding tube for nuclear fuel obtained with the apparatus of FIGS. 1 to 4.
Figure 6:
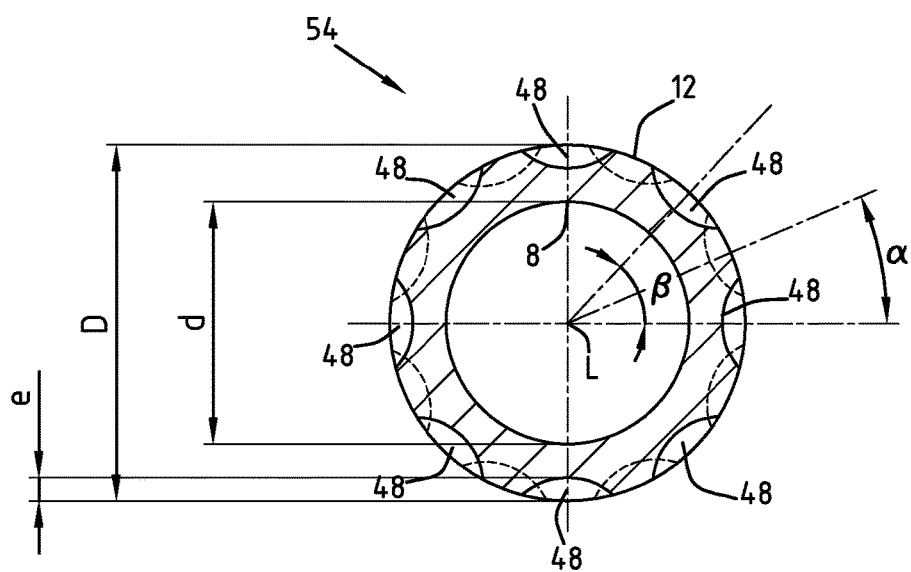

FIGS. 5 and 6 show a portion of the length of a cladding tube 54 obtained by the pilgrim rolling method according to the invention implemented with the aid of the apparatus 2 of FIGS. 1 to 4.

The cladding tube 54 is tubular and cylindrical with an axis L. It has a smooth cylindrical internal surface 8 and a cylindrical external surface 12 having concave dimples 48 formed during the pilgrim rolling into the external surface 12 within the thickness of the wall of the cladding tube 54.

The dimples 48 are distributed according to a pattern which is repeated along the cladding tube 54.

In the example of FIGS. 5 and 6, the dimples 48 comprise series of dimples 48 situated in the same radial plane and distributed about the axis L at an angle β. The dimples 48 of two adjacent series are offset axially by a step P and angularly by an angle α about the axis L.

In order to obtain such a pattern, during the pilgrim rolling several reciprocating movements are carried out by turning the blank 4 by an angle β about the axis L between each reciprocating movement without advancing the blank 4. Then the blank 4 is turned by an angle α and is advanced by a step p. Then these operations are started again.

The distribution of the dimples 48 is not limited to the illustrated example in FIGS. 5 and 6.

Other patterns can be obtained by modifying the amplitude of the rotation of the blank 4, the step by which the blank 4 is advanced between the reciprocating movements of the dies 10, the number of dies 10, the number of punches 30 borne by each die 10, and/or the position of the punches 30 on the dies 10.

It is for example possible to turn the blank 4 and to advance the blank 4 between each reciprocating movement of the dies 10. The result of this is that when each of the dies 10 includes a punch 30 dimples 48 are obtained which are disposed in a double helix about the tube cladding 54.

Advantageously, the dimples 48 are distributed regularly on the external surface and/or according to a regularly repeated pattern on the external surface.

The dimples 48 have a shape defined by the tip 42 of punch 30 having depth e (FIG. 6).

In the illustrated example, the dimples 48 have the shape of spherical segments of radius W (FIG. 5). Thus the base of the dimples 48 has a radius of curvature W. The contour of the dimples 48 is substantially circular.

The shape of the dimples 48 is not limited to this embodiment. The shape of the dimples 48 depends upon that of the punches 30.

In a variant the contour of the dimples 48 has for instance the shape of an ellipse. In this case the principal axis of the ellipse is oriented longitudinally. In a variant it makes an angle with the axis L.

The punch or punches 30 of each die 10 is or are preferably disposed in the calibration region 26 of the groove 20 in such a way as to make a dimple 48 in a section 50 of the blank 4 during the last passage of the dies 10 on this section 50. This makes it possible to control the shape of the dimple 48, since it is made in a final stage in which the section 50 is substantially in its final state of deformation.

Figure 7:
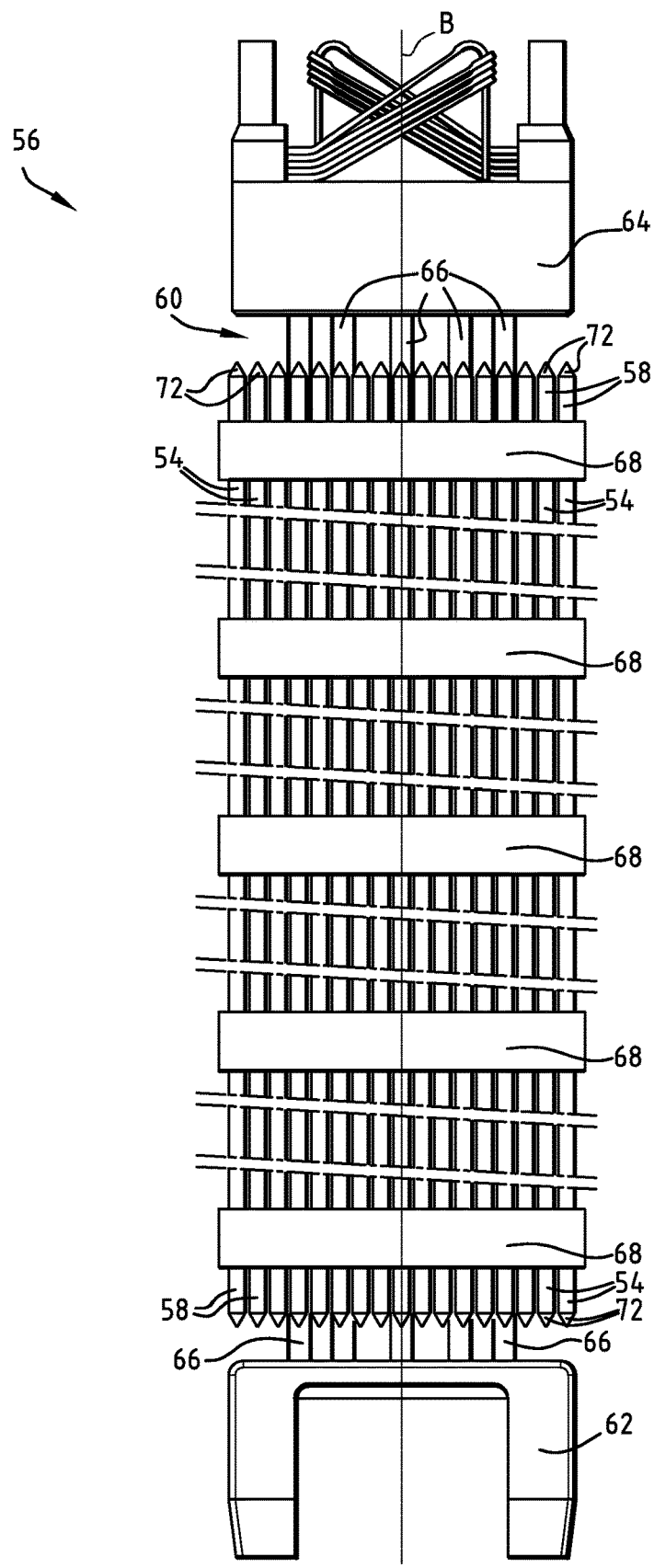
FIGS. 7 and 8 show schematic views, respectively from the side and in cross-section, of a nuclear fuel assembly comprising a bundle of fuel rods formed from cladding tubes according to FIGS. 5 and 6.

FIG. 7 shows a schematic illustration of a nuclear fuel assembly 56 for a light water nuclear reactor of the PWR type. In this type of reactor, in operation light water serves as moderator for the nuclear reaction and as heat transfer fluid for the heat exchanges.

The assembly 56 extends in a longitudinal direction B, intended to be vertical when the assembly 56 is disposed in the core of a nuclear reactor. This direction is the principal flow direction of the water.

In a known manner the assembly 56 comprises a bundle of nuclear fuel rods 58 containing the fissile material and a structure 60 to support and retain the fuel rods 58.

The structure 60 conventionally comprises a lower nozzle 62, an upper nozzle 64, guide tubes 66 and spacer grids 68 for retaining the fuel rods 58.

The lower nozzle 62 and the upper nozzle 64 are disposed at the longitudinal ends of the assembly 56.

The guide tubes 66 extend longitudinally between the nozzles 62, 64 and are fixed at their longitudinal ends on the nozzles 62, 64. Thus the guide tubes 66 connect the nozzles 62 and 64 to one another.

In a conventional manner the guide tubes 66 are intended to receive via their open upper ends cluster rods which do not contain fissile material and which when present or when inserted more or less substantially allow control of the nuclear reaction. In a variant at least one of the guide tubes 66 is replaced by an instrumentation tube intended to allow the insertion via its open lower end of an instrumentation device of the reactor.

The grids 68 are fixed on the guide tubes 66 and distributed along the guide tubes 66 between the nozzles 62, 64.

The fuel rods 58 are disposed longitudinally in a bundle and extend through the grids 68. The grids 68 ensure that the fuel rods 58 are retained in the structure 60. The fuel rods 58 terminate at a distance from the end nozzles 62, 64.

Each fuel rod 58 is formed by a cladding tube 54 according to FIGS. 5 and 6 filled with nuclear fuel pellets 70 (FIG. 8) of cylindrical shape stacked inside the cladding tube 54 and closed by two plugs 72 disposed at the ends of the cladding tube 54. The stack of pellets 70 is generally designated as a "fissile column".

Figure 8:
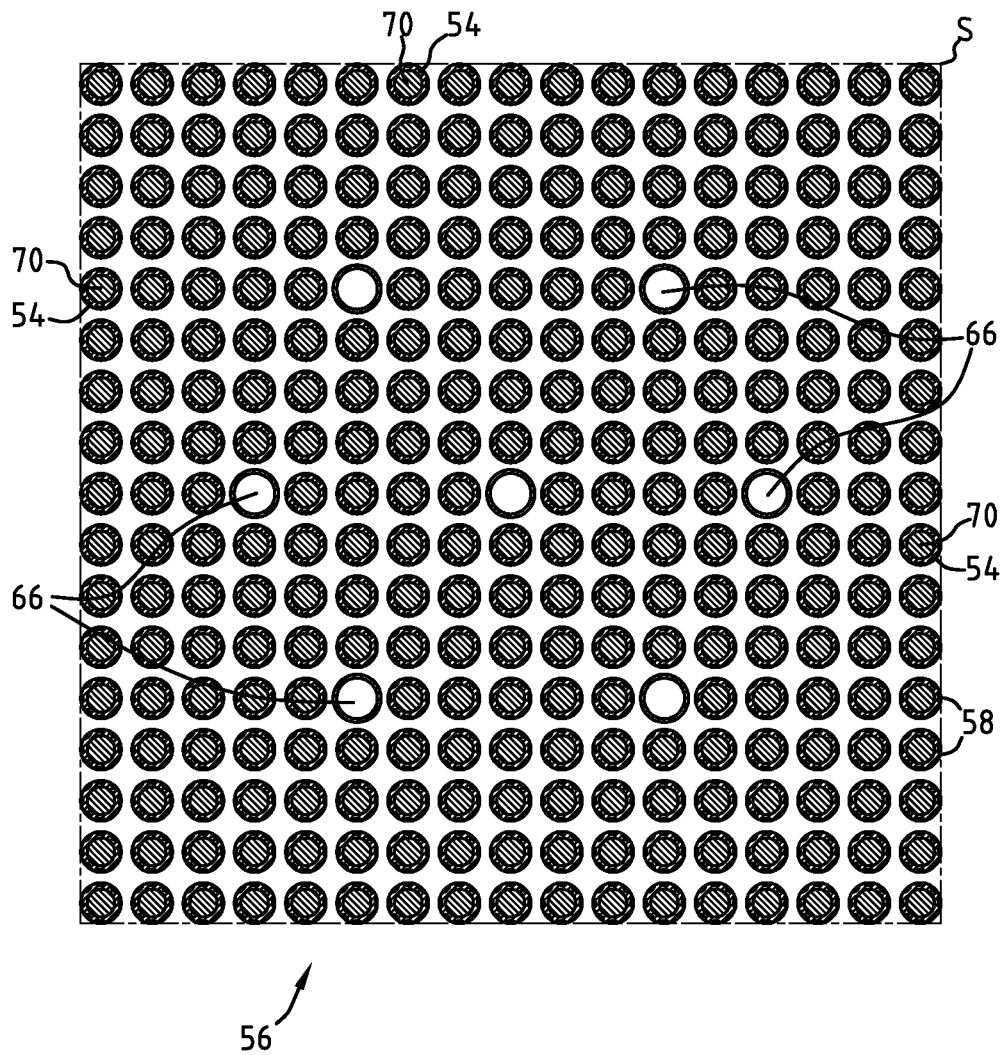

As shown in FIG. 8, the fuel rods 58 and the guide tubes 66 are disposed in a lattice with a square base. The fuel rods 58 and the guide tubes 66 are kept spaced by the spacer grids 68 for the water to pass between them in the direction B (perpendicular to the plane of FIG. 8).

FIGS. 7 and 8 show a typical fuel assembly 56 with a square array for a PWR. The fuel assemblies 56 for VVER typically have a hexagonal array. The structure used for a BWR fuel assembly is also different but the fuel pellets and the fuel rods are similar, the dimensions being adapted to each specific design. In all cases, the cladding tube 54 is for example made in a zirconium based alloy.

A customary grid for a fuel assembly for a pressurised water reactor (PWR) defines a lattice with a square base including for example between 14 and 19 cells on each of its sides, a plurality of cells receiving guide tubes distributed in the lattice, and as an option a central cell for receiving an instrumentation tube.

A customary grid for a fuel assembly for a boiling water reactor (BWR) defines a lattice with a square base including for example between 6 and 13 cells on each of its sides and at least one cell for receiving for instance a water rod or a water channel which replaces 1 to 5×5 fuel rods and may have different form and position within the structure.

During operation of the nuclear reactor water circulates along the cladding tubes 54 in order to exchange heat with the nuclear fuel contained in the cladding tube 54.

The dimples 48 increase the heat exchanges through the wall of the cladding tube 54 and therefore improve the operation and the performance of the assembly 56.

As a matter of fact each dimple 48 creates locally on the external surface 12 of the cladding tube 54 turbulences which favour the heat exchanges between the fluid and the cladding tube 54.

The turbulences occur more specifically in the form of a vortex which forms in the base of the dimple 48. The vortex causes a flow of water towards the base of the dimple 48 and a flow of vapour bubbles towards the exterior of the dimple 48.

This type of turbulence can have a positive or negative effect on the heat exchange through the wall of the cladding tube 54. Nevertheless, the experiments carried out by the inventors have shown that this effect is mainly positive under the conditions of use of the Light Water nuclear Reactors (BWR or PWR).

A phenomenon encountered in nuclear reactors is the deposition of a layer of oxide particles on the external surface 12 of the cladding tubes 54, generally called "CRUD" (an acronym for Chalk River Unidentified Deposit). This layer limits the heat exchanges through the wall of the tube. This results in a loss of effectiveness and an increase in the risks of accident.

The experiments carried out by the inventors have shown that the dimples 48 make it possible to limit the formation of "CRUD". This is perhaps due to the fact that the vortex turbulences prevent the CRUD deposition.

Since the dimples 48 are formed as cavities on the external surface 12, the gap to the flow of the water through the assembly 56 between the fuel rods 58 is not affected. This makes it possible to preserve the external diameter of the cladding tubes 54 with respect to those of conventional design, and to preserve the free cross-section in the assembly 56 for the passage of the water.

It is believed that obtaining the dimples 48 by compressive deformation makes it possible to preserve the homogeneity of the material and to avoid the local cutting of the grain structures which would be generated by a method of removal of material (chemical, mechanical . . . ).

Tests carried out by the inventors have shown that the dimples 48 have an additional beneficial effect in the event of LOCA (Loss Of Coolant Accident) during which a local heating of a tube causes the formation of a bulge until this bulge bursts and the fuel contained in the tube disperses.

FIG. 9 shows a conventional first tube 73 (on the left) of smooth external surface 12 and a second cladding tube 54 (on the right) according to the invention after a LOCA test. In a postulated loss of coolant accident, fuel temperature is increased for several minutes until the emergency core cooling system (ECCS) recovers the coolability of the reactor core. Several conventional tests have been done for various conditions in temperature and hold times, always resulting in the same behaviours.

At the end of the test, the first tube 73 has a bulge 74 with an opening 76. The second cladding tube 54 has a bulge 78 of a lesser magnitude but extending over a greater length.

This may be due to the fact that the bulges are usually initiated close to zones of reduced thickness of the wall (for example due to a knock or a scratch) and in a hot region of the tube. The dimples 48 improve the uniformity of temperature by the increase in the heat exchanges and provide distributed variation in thickness whereby this may be the cause for a less extensive deformation extending over a greater length. As a result, the tube cladding 54 can resist for a longer time in the case of LOCA.

The method of manufacture by pilgrim rolling makes it possible to obtain cladding tubes 54 of small diameter and of great length without welding. The dimples 48 are obtained directly during this process without an additional manufacturing stage.

The dimples 48 are obtained on the external surface 12 of the cladding tube 54 without affecting the internal surface 8 which remains smooth and of which the diameter depends solely upon the mandrel 6.

The adjustment of the distribution of the dimples 48 on the external surface 12 of the cladding tube 54 is achieved easily by controlling the advance and the rotation of the blank 4 between each reciprocating movement of the dies 10.

The shape of the dimples 48 is chosen easily with the aid of punches 30, and their depth e is adjusted easily by adjustment of the punches 30. In any case the dimples 48 are non-trough cavities and the depth e of the dimples 48 is less than the thickness of the wall of the cladding tube 54.

The above advantages would not be obtained in a method of manufacture of the cavities by machining of the tube by mechanical, electromechanical, chemical or laser means.

The following elements can be chosen in particular for the production of the cladding tube 54:
external diameter D of the cladding tube 54;
internal diameter d of the cladding tube 54;
thickness of wall of the cladding tube 54;
shape of each dimple 48;
radius of curvature W of the base of each dimple 48;
greater dimension of the contour of the dimple 48 (diameter of the circular contour or length of the great axis of the elliptical contour);

depth e of each dimple 48;

density of the dimples 48 on the external surface 12 of the cladding tube 54; and pattern of distribution of the dimples 48 on the external surface 12 of the cladding tube 54.

According to one aspect of the invention, the cladding tube 54 has an external diameter D between 6 and 20 mm and a wall thickness between 0.4 and 1.5 mm. The base of each dimple 48 has a radius of curvature W between 0.5 mm and 50 mm. Each dimple 48 has a depth e between 10% and 60% of the wall thickness of the cladding tube 54. The dimples 48 cover 10% to 60% of the external surface 12 of the cladding tube 54.

These dimensions make it possible to obtain a cladding tube 54 which has sufficient mechanical resistance whilst allowing satisfactory heat exchanges through the cladding tube 54 for use as a cladding tube for nuclear fuel.

The cladding tube 54 is produced for example from a zirconium-based alloy or from steel.

The invention is applicable in particular to the manufacture of cladding tubes 54 for light water reactor nuclear fuel, and more generally to the manufacture of tubes.

In different applications of the cladding tubes for nuclear fuel, it is possible to provide a tube with an internal surface which is not smooth but provided with longitudinal reliefs. For this purpose the cross-section of the calibration region 26 of the mandrel 6 is adapted.

What is claimed is:

1. A pilgrim rolling apparatus for the manufacture of a cladding tube for a nuclear fuel rod from a tubular blank, the cladding tube being made from a metal, the cladding tube comprising dimples on an external surface, the pilgrim rolling apparatus comprising:

at least two dies; and a mandrel received between the dies mounted to carry out reciprocating movements along the mandrel for rolling a blank fitted onto the mandrel between the mandrel and the dies, wherein at least one of the dies has at least one punch to form punch dimples into an external surface of the blank fitted on the mandrel during the reciprocating movements of the dies, wherein each die comprises a peripheral groove, the grooves of the dies forming a passage for the mandrel between the dies, each punch being disposed at a base of the groove of the corresponding die, wherein the mandrel is of convergent shape along an axis of the mandrel, the or each punch being disposed in a calibration region of the groove of the corresponding die defining the passage for the mandrel when the dies are advanced and surround an end of the mandrel with a smaller diameter.

2. The apparatus as recited in claim 1 wherein each die comprises at least one punch.

3. The apparatus as recited in claim 1 wherein the at least one punch is configured for punching dimples each having the shape of a spherical or ellipsoidal segment.

4. The apparatus as recited in claim 3 wherein the at least one punch is configured for punching dimples each having a maximum dimension greater than 0.8 mm.

5. The apparatus as recited in claim 3 wherein the at least one punch is configured for punching dimples each having a radius of curvature between 0.5 mm and 50 mm.

6. The apparatus as recited in claim 3 wherein the at least one punch is configured for punching dimples each having a depth between 10% and 60% of the wall thickness of the cladding tube.

\* \* \* \* \*